July 12, 1955  W. E. HARRIS  2,712,847
METHOD OF MAKING PNEUMATIC TIRES
Filed Nov. 25, 1952  4 Sheets-Sheet 1
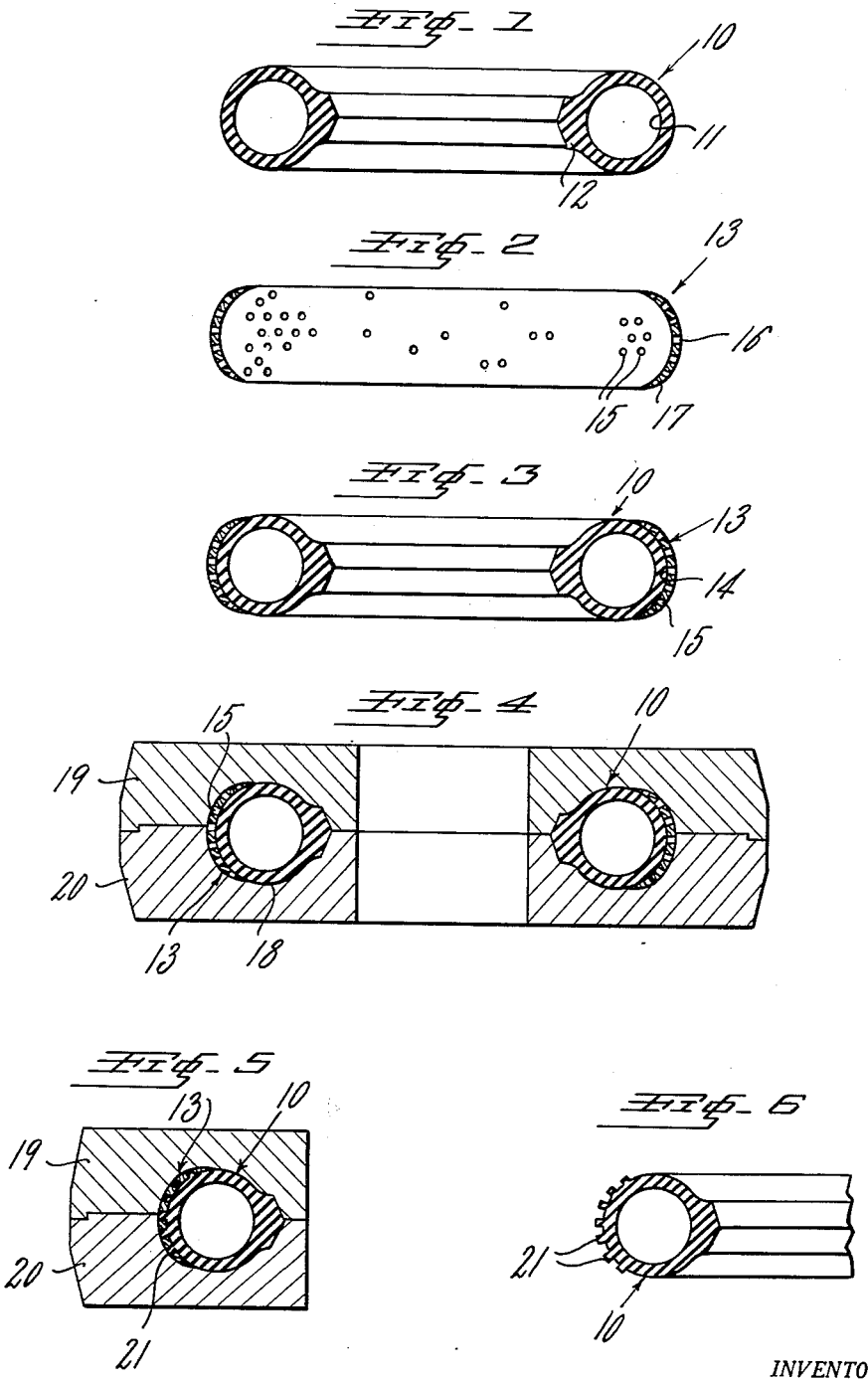
INVENTOR.
WILBUR E. HARRIS
BY James J Long
AGENT July 12, 1955  W. E. HARRIS  2,712,847
METHOD OF MAKING PNEUMATIC TIRES
Filed Nov. 25, 1952  4 Sheets-Sheet 2
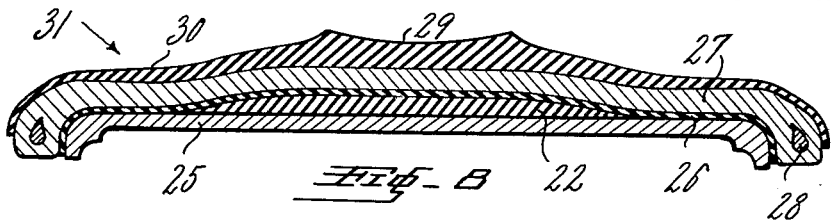
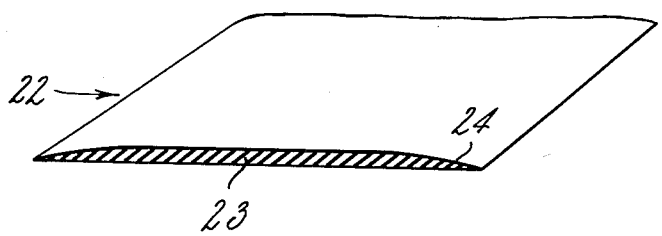
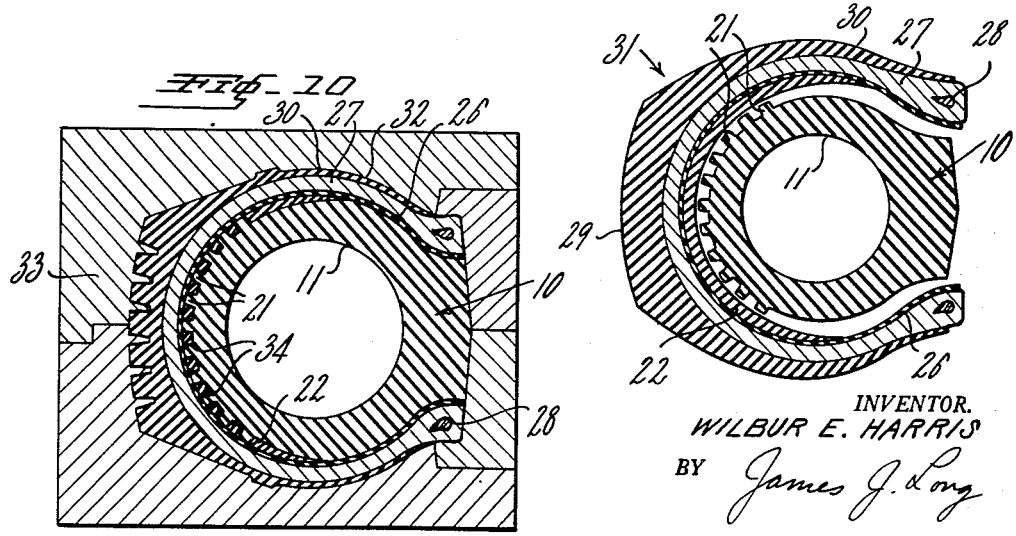
INVENTOR.
WILBUR E. HARRIS
BY James J. Long
AGENT July 12, 1955 W. E. HARRIS 2,712,847
METHOD OF MAKING PNEUMATIC TIRES
Filed Nov. 25, 1952 4 Sheets-Sheet 3
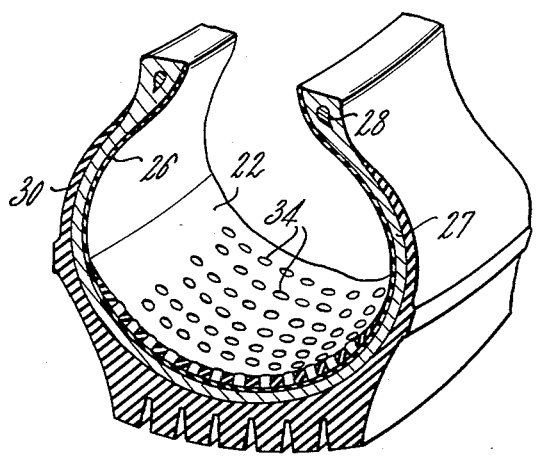
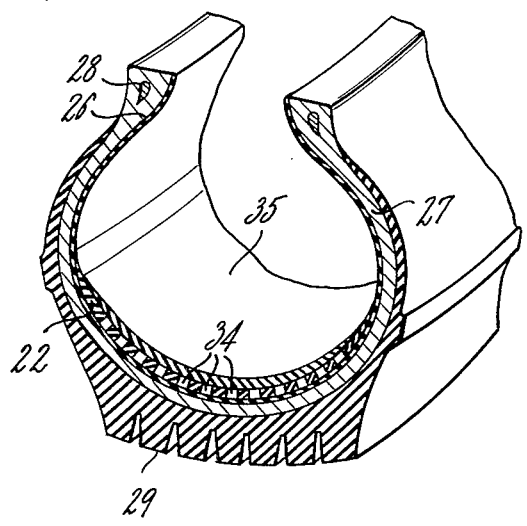
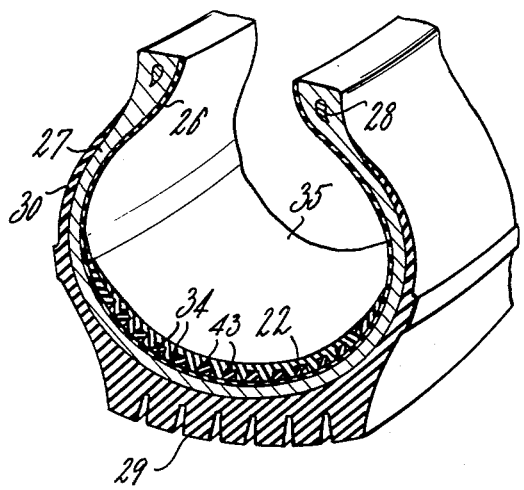
INVENTOR.
WILBUR E. HARRIS
BY James J. Long
AGENT

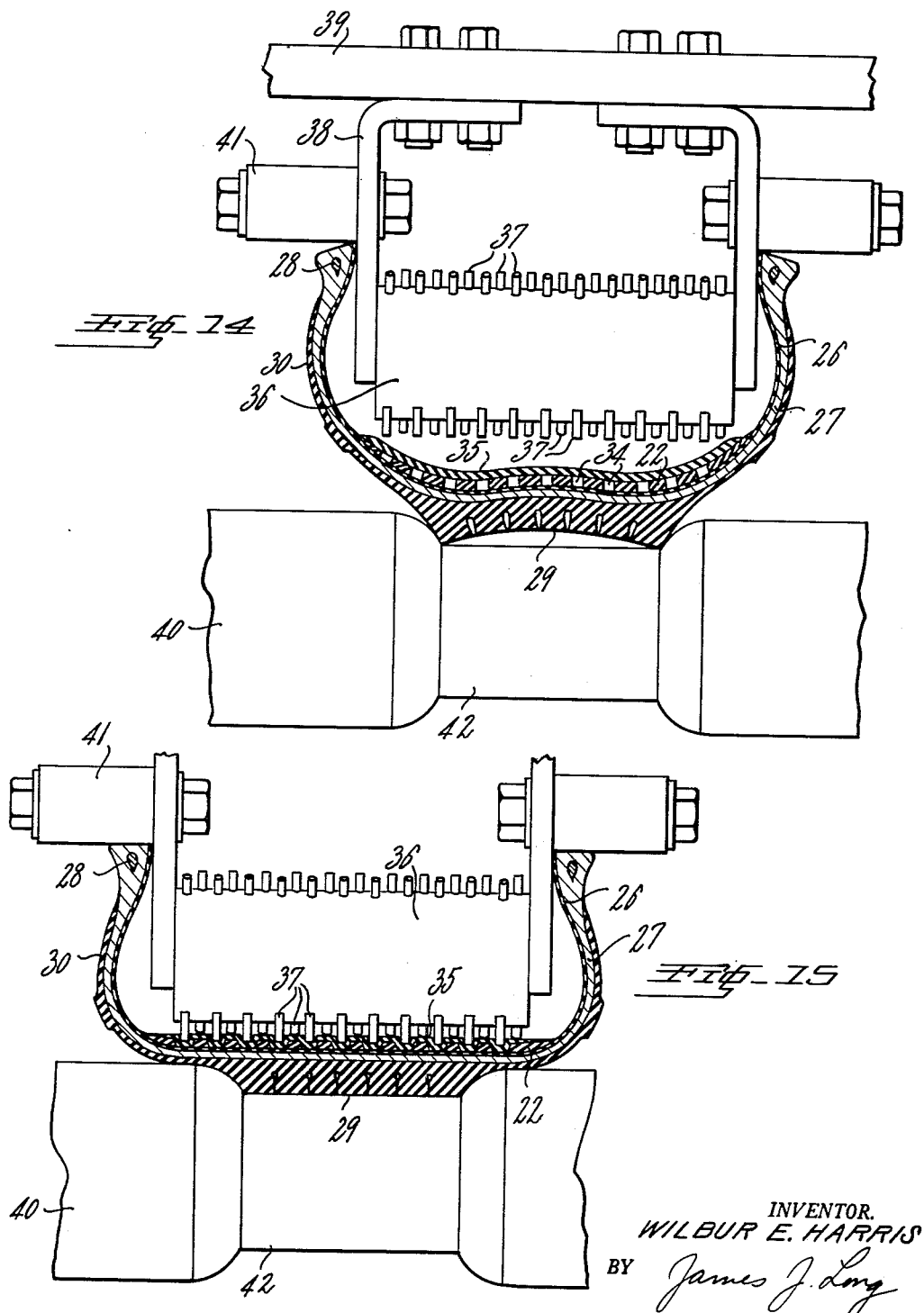

United States Patent Office 2,712,847
Patented July 12, 1955

2,712,847
METHOD OF MAKING PNEUMATIC TIRES

Wilbur E. Harris, Indianapolis, Ind., assignor to United States Rubber Company, New York, N. Y., a corporation of New Jersey Application November 25, 1952, Serial No. 322,505

3 Claims. (Cl. 154—14)

This invention relates to an improved method of making a tubeless type of pneumatic tire, and more particularly it relates to a method of making a pneumatic tire including a layer of puncture-sealing material, and a restraining means for keeping said puncture-sealing material in place in the assembly.

It has been proposed to incorporate in a pneumatic tire assembly a layer of self-sealing or puncture-sealing material to forestall rapid deflation of the tire if the tire is accidentally pierced by a sharp object. Such puncture-sealing layer is made of relatively low viscosity, somewhat tacky stock, which is capable of being drawn out through a wound in the tire as the foreign object which made the wound is withdrawn, thereby effectively sealing the wound against leakage of air.

The sealant plastic, if it is to function properly, must be relatively flowable, in order to enter and seal a hole. Because it is flowable, there is a tendency for the sealant layer to become unevenly distributed, instead of remaining uniformly spread over the surface of the tire. In extreme cases, the sealant will migrate to form heavy spots, throwing the tire out of balance and causing vibration and noise. Also, centrifugal force tends to displace the plastic to the center of the crown of the tire, leaving the side areas of the tread unprotected.

A principal object of the present invention is to provide an improved means for incorporating, with the sealant layer of such a tire structure, a restraining means that will prevent undesirable flow or displacement of the sealant layer.

The manner in which the invention accomplishes this, as well as additional objects and advantages, will be made manifest in the following detailed description, which is intended to be read with reference to the accompanying drawings, wherein:

Fig. 1 is a transverse sectional elevation of a raw curing bag used in the process of the invention;

Fig. 2 is a similar view of an annular perforated plate or ring adapted to be disposed over the crown portion of the raw curing bag;

Fig. 3 is a similar view of the curing bag and annular plate or ring in assembled relation;

Fig. 4 is a similar view showing the assembly of curing bag and plate or ring as initially disposed in a curing bag vulcanizing mold;

Fig. 5 is a similar fragmentary view of the mold after the curing bag has been subjected to internal pressure and heat;

Fig. 6 is a similar view of the curing bag after it has been vulcanized and removed from the mold and from the plate or ring;

Fig. 7 is a fragmentary perspective view of a strip of vulcanizable rubber grid stock which is to form the restraining means in accordance with the invention;

Fig. 8 is a transverse sectional view of a raw tire band that is assembled on a tire building drum;

Fig. 9 is a transverse sectional view of the curing bag disposed within the raw tire in annular toroidal form;

Fig. 10 is a similar view of the assembled curing bag and tire disposed within a vulcanizing mold;

Fig. 11 is a fragmentary perspective view of the vulcanized tire removed from the mold;

Fig. 12 is a fragmentary perspective view of a layer of plastic sealant material;

Fig. 13 is a similar view of the tire with the layer of sealant material placed therein;

Fig. 14 is a fragmentary elevational view, with parts in section, of the tire assembly as initially placed in a device for incorporating the plastic sealant;

Fig. 15 is a similar view of the tire in operative engagement with the device; and Fig. 16 is a fragmentary perspective view of the completed tire.

According to the invention, the plastic sealant material is maintained in place in the desired functional position in the crown of the tire with the aid of a restraining grid, containing a multiplicity of perforations into which the plastic sealant is forced, such restraining grid being formed as an integral part of the tire during the vulcanization thereof, with the aid of a specially formed curing bag having pegs in its surface for the purpose of forming the perforations during the tire vulcanizing operation.

Referring to the drawings, Fig. 1 shows a raw curing bag 10 of annular toroidal form, provided with the usual internal cavity 11 into which a heated fluid medium, such as hot water, may be introduced under pressure through suitable connecting valves (not shown) for the purpose of applying internal heat and pressure to the tire during the vulcanizing operation. The interior or rim portion 12 of the curing bag is relatively thickened, and is so shaped as to conform to the bead section of the tire to maintain the beads properly in place, in cooperation with the curing mold, during cure of the tire. The curing bag 10 is made of vulcanizable rubbery stock, usually based on Butyl rubber, and, after vulcanization, it has a certain amount of extensibility and resilience.

There is also provided an annular ring 13 of metal or other suitable material having a curved configuration such that the raw curing bag 10 is adapted to be disposed within the ring, as indicated in Fig. 3. When so assembled, the ring 13 extends over the crown surface 14 of the curing bag. The ring 13 is perforated by a multiplicity of relatively small holes 15 over its entire surface, and the ring has its greatest thickness at its circumferential center line 16, and is gradually tapered to a lesser thickness towards each of its edges 17.

The assembly of curing bag 10 and perforated plate or ring 13 is then disposed within a cavity 18 of a curing bag mold, constituted of separable upper and lower mold halves 19 and 20, that are adapted to be heated to vulcanizing temperatures by suitable means (not shown), as indicated in Fig. 4. When the assembly is initially disposed within the curing bag mold, the holes 15 of the metal ring or plate 13 are not filled with the curing bag stock. However, after applying heat to the curing bag mold to vulcanize the curing bag, while applying internal pressure to the cavity 11 of the bag to cause it to conform to the mold, the curing bag stock flows into the holes 15, thereby forming in the crown surface of the bag a series of projections or pegs 21, as indicated in Figs. 5 and 6. Because of the tapered shape of the ring 13, the pegs 21 project outwardly more at the center line of the crown of the curing bag, than they do at either side of the crown.

There is then provided, as indicated in Fig. 7, a strip 22 of vulcanizable rubber stock suitable for forming the grid portion or restraining member of the tire. Such a stock may be formulated according to conventional practice, and may be formed, for example, by extrusion or calendering. The strip 22 of grid stock is preferably made somewhat thick at its center 23, and is gradually tapered to a lesser thickness at each of its sides 24. The grid strip 22 is of sufficient width to extend across the crown surface of the pneumatic tire in which it is to be incorporated, and partially down each sidewall portion of the tire.

Assembly of the tire is accomplished by initially placing the grid strip 22 on the surface of the usual collapsible tire building drum 25, along the center line thereof, as indicated in Fig. 8. There is then applied over the surface of the grid strip and the remaining surface of the tire building drum a relatively thin layer 26 of air-impervious vulcanizable rubber stock of the kind usually used to line the inner surface of the tubeless type of tire. The rubberized fabric carcass plies 27 and the inextensible bead members 28 of the tire are then assembled over the liner stock 26 in accordance with the usual tire building practices, and a vulcanized rubber tread 29 and sidewall 30 assembly is applied over the carcass to complete the raw tire band.

The raw tire, designated generally by the numeral 31, is then removed from the drum 25 by collapsing the drum in the usual manner, and thereafter the raw tire casing is shaped into annular band form with the aid of the usual vacuum shaping box (not shown), wherein the specially prepared curing bag 10 is inserted within the tire 31 as indicated in Fig. 9. In order to prevent the curing bag from adhering to the grid stock, the bag surface is first coated with a lubricant or anti-sticking substance. For this purpose an anti-adhesive that is soluble in water or organic solvents is used, in order that it may be readily removed from the interior of the cured tire casing by washing with water or solvent. Vegetable oil soaps, glycols, and similar water soluble lubricants are suitable. The following is an example of a preferred lubricant:

| Ingredients: | Parts by weight |
|---|---|
| Carbowax-6000 (trade name for polyethylene glycol monoalkyl ether) | 20.0 |
| Ucon 50HB660 [trade name for poly (ethylene-propylene) glycol monoalkyl ether] | 20.0 |
| Vegetable oil soap | 20.0 |
| Water | 4.0 |

The knobbed curing bag is dipped in this lubricant prior to insertion in the uncured tire. Insoluble materials such as talc, which cannot readily be washed out of the cured casing, should be avoided in the lubricant.

The assembly of raw tire 31 and curing bag 10 is then disposed within a cavity 32 of a conventional tire vulcanizing mold 33, as indicated in Fig. 10, and the whole assembly is heated to vulcanizing temperature, while applying internal pressure within the cavity 11 of the curing bag. The tread 29 of the tire is thereby forced to conform to the usual projections 34 on the tread surface of the mold cavity to form an anti-skid pattern in the tread and, in a similar manner, the projections 21 on the crown surface of the curing bag are urged forceably into the layer 22 of grid stock on the interior crown surface of the tire, thereby forming corresponding holes or recesses 34 in the grid stock layer. The appearance of the resulting tire after vulcanization is shown in Fig. 11. After the tire is cured, any lubricant transferred from the curing bag to the grid or honeycomb structure is removed by flushing with water. The tire is then dried.

In order to incorporate the plastic sealant material in the tire, a layer of such plastic 35 is formed in suitable thickness and width, as indicated in Fig. 12, by an extrusion or calendering operation. Methods of formulating such plastic sealant materials are well understood by those skilled in the art. The layer of sealant material is laid over the grid layer 22 of the vulcanized tire as shown in Fig. 13. In order to force the sealant material 35 into the perforations 34 of the grid layer, there is provided a device, as shown in Fig. 14, including a pegged roller 36 having extending from its surface a series of cylindrical plugs or projections 37 of somewhat smaller diameter than the perforations 34 of the grid layer 22, arranged and spaced in accordance with the perforations in the grid layer. The roller 36 is rotatably mounted between a pair of depending angle brackets 38 extending from an overhead support 39, and the roller is of such axial length that it fits within the tire casing and extends over the crown section of the casing containing the plastic sealant 35. Below this assembly there is provided a power driven rubber covered roller 40 that is adapted to be moved upwardly and downwardly toward and away from the roller 36 by suitable means (not shown), for the purpose of forcing the interior of the tire casing into firm contact with the roller 36, as shown in Fig. 15. The proper positioning of the tire casing with respect to the roller 36 is insured by the provision of a horizontally extending guide roll 41 projecting outwardly from the side of each of the angle brackets 38 at such a position that the beads of the tire casing bear firmly against the juncture of the guide rollers 41 with the angle brackets 38 when the roller 40 is moved forceably upward, as indicated in Fig. 15. To further insure proper conformity between the tire casing 31, the pegged roller 36 and the driven roller 40, the surface of the driven roller 40 is recessed at 42 in accordance with the profile of the tire tread. To force the sealant into the perforations 34, the roller 40 is driven slowly while forcing the tire upwardly against the pegged roller 36. The rotation of the roller 40 causes the tire casing 31 to rotate, and this in turn causes the pegged roller 36 to rotate. This operation is continued, preferably with repeated reversal of the direction of rotation until the sealant is worked thoroughly into all of the empty spaces provided by the holes 34. The appearance of the tire after completion of this operation is as shown in Fig. 16, and it will be noted that a sufficient excess of the plastic sealant is employed to provide a thin layer of sealant 43 over the portions of the grid intermediate the holes 34. The completed assembly therefore provides a coating or layer of sealant that covers the entire tread or crown area of the tire, which is the area most susceptible to puncture. The construction is effective whether such puncture occurs at one of the perforations containing the bulk of the sealant, or whether the puncture occurs in between a perforation, because at such intermediate raised areas there is also a residual layer of sealant available for sealing any puncture.

The retaining grid work or honeycomb structure provided by the perforated layer prevents the sealant from undergoing undesirable plastic flow. There is therefore no opportunity for the sealant to gather in one place along the center line of the crown under the influence of centrifugal force, thereby leaving the side portions of the tread devoid of protection. Also, there is no danger of the sealant becoming unevenly distributed circumferentially, and throwing the tire out of balance, with consequent noise, vibration, and difficult steering.

The method of assembly described permits the sealant to be effectively and firmly embedded in the retaining network provided by the restraining layer.

Because the sealant material is essentially immobilized by the retaining means, it is possible to employ the most satisfactory sealant compounds, which have adequate plastic flow to provide the desired protection, and are entirely free from any tendency to fatigue cracking.

Having thus described my invention, what I claim and desire to protect by Letters Patent is:

1. A method of making a pneumatic tire comprising in combination the steps of building a raw tire casing comprising an outer vulcanizable rubber tread and an inner carcass composed of vulcanizable rubberized fabric with a sheet of unvulcanized rubber applied to the central area of the raw carcass constituting the interior surface of the said casing, shaping and vulcanizing the resulting assembly while molding perforations in said sheet, subsequently placing a layer of puncture-sealant plastic over said perforated sheet, and forcing the sealant plastic into said perforations, whereby the sealant plastic is maintained in place in use by the restraining action of the thus-vulcanized perforated sheet on flow of the said plastic.

2. A method of making a pneumatic tire comprising in combination the steps of building a raw tire comprising an outer vulcanizable rubber tread and an inner carcass composed of vulcanizable rubberized fabric with a sheet of unvulcanized rubber applied to the central interior area of the raw carcass constituting the interior surface of the said casing, providing a curing bag having pegs projecting from its crown surface, coating the pegged curing bag with a mold lubricant to prevent the pegged curing bag from sticking to the said sheet of unvulcanized rubber, disposing the pegged curing bag within the raw tire carcass, vulcanizing the said assembly in a mold wherein the said pegs impress corresponding holes in the said sheet of rubber, washing the interior of the vulcanized tire to remove any excess mold lubricant therefrom, drying the tire, subsequently placing a layer of plastic puncture-sealant plastic over said sheet of rubber containing the said impressed holes, and forcing the sealant plastic into said holes, whereby the sealant plastic is maintained in place in use by the restraining action of the thus-vulcanized perforated sheet on flow of the plastic.

3. A method of making a puncture-sealing tire comprising in combination the steps of assembling on a tire building drum a layer of vulcanizable rubber grid stock having its greatest thickness at its center and being gradually tapered toward each marginal edge, said grid stock layer extending over the central portion of the drum that will correspond to the crown portion of the finished tire, assembling over said grid stock layer a layer of air-impervious vulcanizable rubber stock extending from one side of the drum to the other, applying over said air-impervious layer a rubberized fabric carcass, and applying over said carcass a vulcanizable rubber tread and sidewall assembly, removing the resulting tire band from the drum, providing a curing bag having pegs in its crown surface, shaping the tire band in annular toroidal form with the aid of said curing bag, vulcanizing the tire in a tire mold with the said curing bag contained within the tire, the said pegs being forced into the said grid stock layer during the vulcanization to impress holes therein, removing the tire from the vulcanizing mold and removing the said curing bag from the tire, subsequently applying a layer of plastic sealant material over the said grid layer containing the said holes, and working a roller having pegs in its surface spaced according to said holes against the sealant layer to force the said sealant plastic material into the said holes, whereby the sealant plastic is maintained in proper operable position in use by the restraining action of the thus-molded and vulcanized grid layer on flow of the plastic.

References Cited in the file of this patent

UNITED STATES PATENTS

| | | |
|---|---|---|
| 496,527 | Morris | May 2, 1893 |
| 496,528 | Morris | May 2, 1893 |
| 2,612,461 | Hallgren | Sept. 30, 1952 |
| 2,622,052 | Chandler | Dec. 16, 1952 |